US012608550B2

(12) United States Patent
Jadhav et al.

(10) Patent No.: US 12,608,550 B2
(45) Date of Patent: Apr. 21, 2026

(54) IMPROVING ACCURACY OF Gen. AI DRIVEN DOCUMENT ANALYSIS

(71) Applicant: ACCENTURE GLOBAL SOLUTIONS LIMITED, Dublin (IE)

(72) Inventors: Suraj Govind Jadhav, Mumbai (IN); Ashwin Ramachandran, Coimbatore (IN); Krishna Kummamuru, Bangalore (IN); Siddharth Dawar, New Delhi (IN); Manoj Shroff, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 163 days.

(21) Appl. No.: 18/604,219

(22) Filed: Mar. 13, 2024

(65) Prior Publication Data

US 2025/0148209 A1     May 8, 2025

(30) Foreign Application Priority Data

Nov. 8, 2023    (IN) .............................. 202311076295

(51) Int. Cl.
G06F 40/295          (2020.01)
G06F 40/247          (2020.01)
G06F 40/284          (2020.01)
(52) U.S. Cl.
CPC .......... G06F 40/295 (2020.01); G06F 40/247 (2020.01); G06F 40/284 (2020.01)
(58) Field of Classification Search
None
See application file for complete search history.

(56) References Cited

U.S. PATENT DOCUMENTS

| | | | | |
|---|---|---|---|---|
| 9,965,460 | B1 * | 5/2018 | Wasiuk ................. | G06F 40/295 |
| 11,354,340 | B2 * | 6/2022 | Allen .................... | G06F 16/338 |
| 11,449,556 | B2 * | 9/2022 | Jawagal ............... | G06F 40/284 |
| 2017/0371955 | A1 * | 12/2017 | Allen .................. | G06F 16/3329 |
| 2018/0341871 | A1 * | 11/2018 | Maitra ................. | G06N 3/0442 |
| 2020/0279001 | A1 * | 9/2020 | Prabhugaonkar ...... | G06N 3/092 |

(Continued)

OTHER PUBLICATIONS

Schick et al. "Toolformer: Language Models Can Teach Themselves to Use Tools". arXiv:2302.04761v1 [cs.CL] Feb. 9, 2023 (Year: 2023).*

(Continued)

*Primary Examiner* — Jesse S Pullias
(74) *Attorney, Agent, or Firm* — Mannava & Kang, P.C.

(57) ABSTRACT

An Artificial Intelligence (AI) & Generative AI-driven cross-domain document analysis system enables accurate and consistent narratives across a longitudinal timeline for an entity regarding communications in different operational aspects. The document analysis and insight system includes an Artificial Intelligence (AI) powered Search Interface (AIPS) and an Advanced Intelligent Knowledge Engine (AIKE). The AIPS is configured to pre-process documents from structured and unstructured data sources to generate data taxonomies and custom synonym files. The AIKE generates a preliminary evaluation of the various Large Language Models (LLMs) and uses the data taxonomies and custom synonym files to generate prompts that are configured to address limitations of the various LLMs to obtain accurate replies to user requirements.

19 Claims, 12 Drawing Sheets

(56)          References Cited

U.S. PATENT DOCUMENTS

| | | | | |
|---|---|---|---|---|
| 2021/0097404 A1* | 4/2021 | Yanosy, Jr. | .............. | G06N 5/04 |
| 2021/0406735 A1* | 12/2021 | Nahamoo | ................ | G06N 3/09 |
| 2024/0311192 A1* | 9/2024 | Maschmeyer | ......... | G06N 5/022 |
| 2024/0420012 A1* | 12/2024 | Austin | ................... | G06N 20/00 |

OTHER PUBLICATIONS

Jiang et al. "LLM-Blender: Ensembling Large Language Models with Pairwise Ranking and Generative Fusion". arXiv: 2306.02561v3 [cs.CL] Jun. 30, 2023 (Year: 2023).*

Hari et al. "Tryage: Real-time, Intelligent Routing of User Prompts to Large Language Models". arXiv:2308.11601v2 [cs.LG] Aug. 23, 2023. (Year: 2023).*

* cited by examiner

304

IMPROVING ACCURACY OF Gen. AI DRIVEN DOCUMENT ANALYSIS

PRIORITY

The present application claims priority under 35 U.S.C. 119(a)-(d) to the Indian Provisional Patent Application No. 202311076295, having a filing date of Nov. 8, 2023, the disclosure of which is hereby incorporated by reference in its entirety.

BACKGROUND

A large language model (LLM) is a type of artificial intelligence (AI) algorithm that uses deep learning techniques and large data sets to understand and generate new content. The term generative AI (Gen. AI) is closely connected with LLMs, which are, in fact, a type of generative AI that has been specifically configured to help generate text-based content. Accordingly, LLMs can perform a variety of natural language processing (NLP) tasks. LLMs can also be referred to as neural networks which form a network of layered nodes. In addition to processing natural languages, LLMs can also be trained to perform a variety of other tasks like understanding protein structures, writing software code, and more. However, LLMs have certain limitations which may lead to inaccuracies in the results produced.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
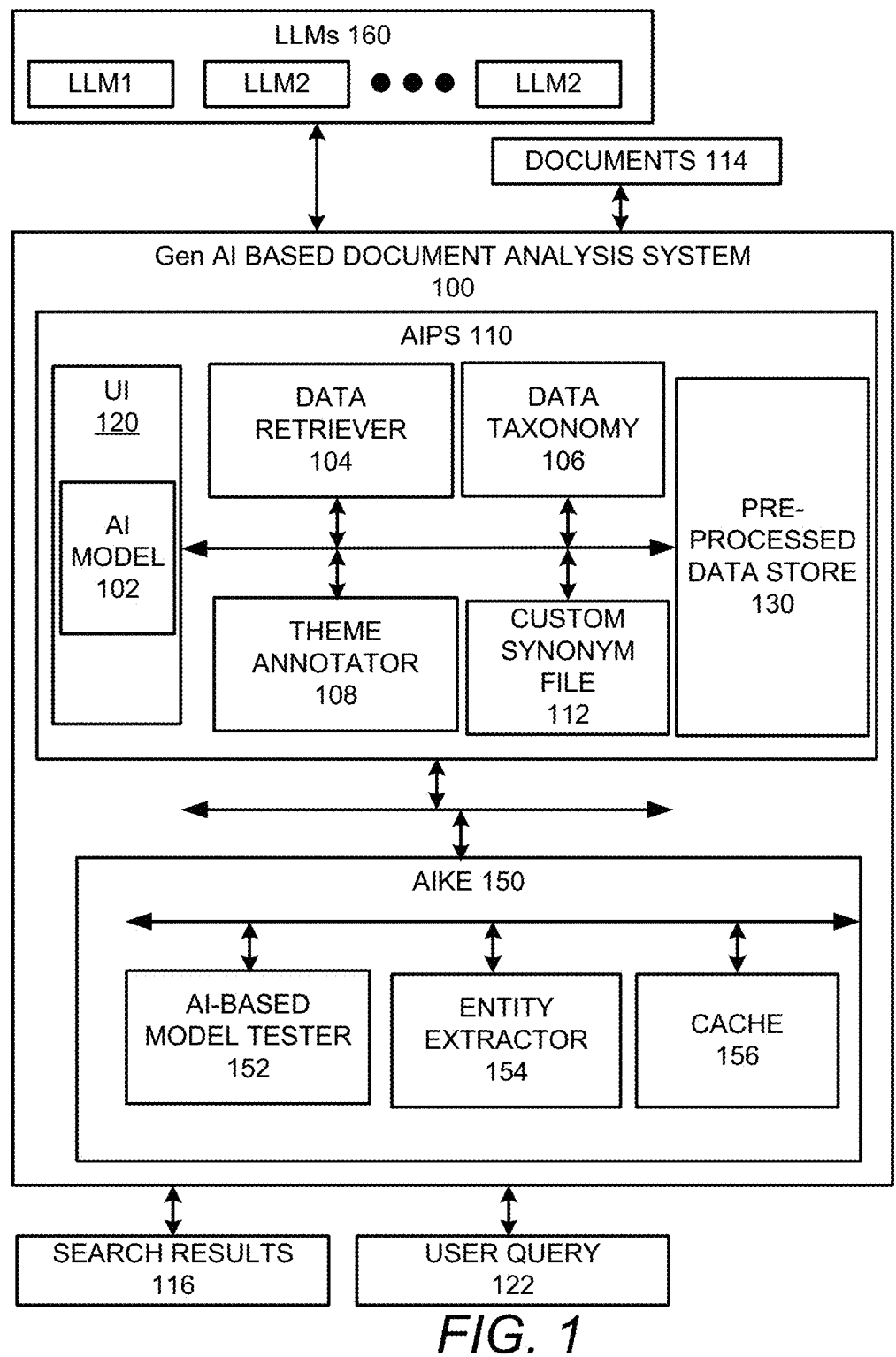
FIG. 1 illustrates a block diagram of a Generative AI-based document analysis system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Discovering information from earlier communications via traditional search engines involves utilizing keyword matching and simple ranking algorithms. These often yield sub-optimal results when dealing with large datasets containing diverse information. Additionally, conventional systems lack the capability to provide in-depth contextual analysis, limiting their ability to discern nuances and relationships within the data, particularly where required across multiple quarters or analyzing trends over time. An Artificial Intelligence (AI) based document analysis system that receives a long context input and automatically generates accurate replies to the user requirements expressed in the inputs is disclosed herein. The AI-based document analysis system includes two primary components—an AI-Powered Semantic Search (AIPS) and an Advanced Intelligent Knowledge Engine (AIKE). The AI-based document analysis system is configured for the pre-processing of structured and unstructured data sources to generate a data taxonomy with entities extracted from the structured and unstructured data sources. In an example, the entities can be extracted from text data of the structured and unstructured data sources which text data is then chunked into paragraphs and annotated with domain context. In an example, the data taxonomy may include one or more knowledge graphs. The AI-based document analysis system also generates a custom synonym file that lists domain-specific synonyms extracted from the structured and unstructured data sources. The AI-based document analysis system also carries out a preliminary evaluation of a plurality of large language models (LLMs) to select one or more LLMs that can provide responses to user queries. In an example, the one or more LLMs can be selected by an AI-based model tester. The AI-based model tester can be trained for LLM selection on features of the plurality of LLMs that include at least, token length, Application Programming Interface (API) wrapper availability, accuracy of responses, bias, false positives, and false negatives.

When a user requirement is received, it is initially verified that a response to the received user requirement is not already stored in a cache and therefore the response to the received user requirement is to be generated. The data taxonomy can be employed to access relevant documents for the received user requirement from one or more of the structured and unstructured data sources. A prompt to be input to the selected one or more LLMs is generated from the relevant documents based at least on the received user requirement. In an example, the prompt may include a paragraph chunk having less than a predetermined number of tokens arranged in complete sentences. The predetermined number of tokens can be based on the token length limitations of the LLMs. To generate the prompt, entities are extracted from the received user requirement, and the required information for response generation is further extracted from the unstructured and structured data sources by matching the entities extracted from the received user requirement with the entities encoded in the data taxonomy.

The required information thus extracted is provided to the selected LLMs along with the prompt.

A response to the prompt is obtained from each of the one or more LLMs and displayed to the user issuing the user requirement. The plurality of responses provided by the selected one or more LLMs are ranked based at least on the semantic similarity of each of the responses with the received user requirement and the top k-ranked responses are displayed for user selection, where k is a natural number and k begins with 1. The top k-ranked responses can include a primary response from a best-performing LLM of the selected LLMs and other sample responses from other eligible LLMs of the one or more selected LLMs. In an example, each of the responses may be framed with a token length such that the total number of tokens of the prompt and the response are less than the predetermined number of tokens (e.g., the token limit of the one or more LLMs). User feedback to the plurality of the responses from the one or more LLMs provided as replies is received and the AI-based model tester is further trained on the user feedback for LLM selection. In an example, further training of the model tester may involve providing inputs that carry differential weights favoring subject matter expert (SME) knowledge and user feedback. The AI-based document analysis system can be configured to store in a cache, one of the plurality of responses receiving the highest user approval as a reply to the received user requirement along with the received user requirement and a subset of the structured and unstructured data sources used for generating the prompt.

The Gen. AI-based document analysis system disclosed herein enables users to discover information that is relevant contextually and/or temporally. An AI model is integrated into a user interface. The AI model is coupled to a backend system for efficient data retrieval from an array of data sources. The document analysis system also includes a data preprocessor. The data preprocessor executes functions such as chunking and annotating information from the array of data sources which may include structured data sources such as relational databases and unstructured data sources such as domain-specific knowledge bases. The data sources may also include data in various formats such as textual data, voice data, video data, etc. The various formats may be converted into a textual format for pre-processing in accordance with some examples. Additionally, entities and their relationships are organized into knowledge graphs along with domain-level facets. This helps the document analysis system significantly refine search results, ensuring that users can access comprehensive and contextually relevant information across multiple quarters or specified time horizons. The document analysis system is also configured for a preliminary, expert-driven LLM evaluation based on token length, applicability to the use case, accuracy of responses, bias, false positives/negatives, etc.

The document analysis system brings together AI, Gen-AI, and HITL (Human In the Loop) and specifically draws upon pre-processing, to ensure precise and accurate responses, from structured and unstructured data and minimizes the effect of bias, false positives/negatives, and hallucination. By customizing the data taxonomy, knowledge graphs, and LLM models, the document analysis system adapts to the unique requirements of different industries and varied functional areas, empowering users with efficient search and data retrieval, knowledge processing, question-answering, and information analysis capabilities—all of which is at a domain level. The same AI-powered platform can be seamlessly extended and scaled to various areas, including external communications, product launches, marketing communications, and beyond where consistency of narrative over time is necessary. The AIPS and AIKE included in the document analysis system along with pre-processing enhance users' interaction with data and information retrieval, knowledge processing, and decision-making across multiple domains. The Gen AI-based document analysis system implements a decision-making engine such that in the interim backend, the decision-making happens based on user feedback and the user gets an assured best response regardless of the LLM used.

The Gen AI-based document analysis system and methods disclosed herein enable a technical solution to the technical problem of improving the accuracy of results output by the various LLMs for domain-specific and/or time-specific queries. A document analysis system that may employ a limited number of LLMs, e.g., one LLM, is restricted to receiving responses from that LLM only regardless of the accuracy of the responses and any improvement in accuracy is dependent on the efficiency of the LLM provider. Different LLMs may perform differently for data from different domains. Furthermore, different LLMs may output responses of different accuracies on a given day based on their development/training by their providers. By enabling a dynamic choice of LLM Application Programming Interface (API) calls among the plurality of different LLMs, the instant Gen AI-based document analysis system can analyze documents of not only different domains with greatest accuracy of the available plurality of LLMs but is also enabled for cross-domain document analysis.

The Gen AI-based document analysis system also includes various elements that further improve the output accuracy of the different LLMs. An example element includes prompt engineering with the contextual knowledge base. To retrieve output from an LLM, a user may input a 'prompt' which includes natural language text that specifies a task to be performed by the LLM. Prompts may have various lengths which range from a couple of words to sentences and may also include documents. Current commercially used LLMs have a predetermined token limit (approximately 8000 tokens or words) for the prompts and the output. Therefore, if a certain number of tokens from the token limit of the LLM is used for the input, the LLM has only the remaining tokens of the token limit to produce the output which restricts the amount of information that can be input and output by the LLM. 'Lost in the Middle' is another issue that can limit the input to the LLM in terms of the number of tokens. Current LLMs cannot make robust use of information in longer inputs. The LLMs perform best when the relevant information is at the beginning or the end of the longer inputs but the accuracy degrades when the relevant information occurs in the middle of the longer inputs. The processing of the documents to generate input chunks of predetermined sizes and in complete sentences for the LLMs as described herein facilitates the LLMs to also overcome the 'Lost in the Middle' problem as the input context size is reduced so that relevant information is at the beginning or the end of the input. Thus, the construction, operation, and functionalities of the Gen AI-based document analysis systems and methods described herein ensure an efficient user experience and complex analyses across time horizons.

FIG. 1 illustrates a block diagram of a Gen AI-based document analysis system 100 (hereinafter referred to as 'the document analysis system 100') in accordance with the examples disclosed herein. The document analysis system 100 receives a user query 122 and processes the user query 122 to obtain search results 116 from resources available to the document analysis system 100. In an example, the document analysis system 100 can employ one or more of a plurality LLMs 160 to generate the search results 116. The user query 122 may include a textual input such as a short query issued to a search engine or the user query 122 may include a long context input such as the upload of one or more documents. The document analysis system 100 is configured with two components including AI-Powered Semantic Search (AIPS) 110 and Advanced Intelligent Knowledge Engine (AIKE) 150. The AIPS 110 includes an AI model 102, a data retriever 104, a data taxonomy 106, a theme annotator 108, a custom synonym file 112, and a pre-processed data store 130. The AIKE includes an AI-based model tester 152, an entity extractor 154, and a cache 156.

The AI model 102 in the AIPS is integrated into a user interface (UI) 120, enabling users to conduct comprehensive searches within a repository of documents across multiple quarters or a defined time horizon. Examples of AI models such as but not limited to AI models for named entity extractors can be integrated in the UI 120 to perform the task of identifying facets or entities present in the user query 122, and for automatically applying the filters for information retrieval based on the identified entities/facets. The AI model 102 can be trained for named entity recognition (NER) on a text corpus, with entities tagged with a start and end tag. The AI model 102 learns from the labeled entities and the spans of text are to be extracted as entities. The data taxonomy 106 and associated search, empowers users to explore a document set through keyword searches, enabling both standard and semantic search options. Notably, manual annotation of themes for logical paragraph segments, coupled with the custom synonym file 112 and natural language processing (NLP), further refine search results. The document analysis system 100 showcases search outcomes by presenting entire relevant paragraphs instead of mere snippets, minimizing user effort.

The AIKE 150 further empowers end-users to leverage the power of Gen AI/LLM, enabling them to extract valuable insights from both structured and unstructured data. Tasks such as summarization, theme generation, and tonality assessment are performed accurately. Beyond answering individual queries or user prompts, the document analysis system 100 also analyzes trends letting users extract valuable insights over a time horizon along with a comprehensive understanding of data patterns and fluctuations. By tapping into the data taxonomies established in AIPS 110, the document analysis system 100 ensures that the extracted insights are contextually accurate and meaningful, making it an indispensable tool for data-driven decision-making processes.

AIPS 110 allows end-users to search on a user-friendly interface e.g., UI 120. The AIPS 110 may include the pre-processed data store 130 which is built by processing documents 114 according to various pre-processing methods described herein that may be implemented by the data retriever 104. The backend of the AI model 102 is built on the data retriever 104 such as elastic search, ensuring efficient and scalable data retrieval. The data taxonomy 106 categorizes documents into themes and logical chunks. To construct the data taxonomy 106, annotation of themes is performed by the theme annotator 108, wherein each paragraph in the documents 114 is labeled with the appropriate theme, letting the AI model 102 categorize and organize information effectively. In an example, entities and relationships between the entities extracted from the documents 114 may be represented as knowledge graphs within the data taxonomy 106. Additionally, the custom synonym file 112 is generated to enhance semantic matching capabilities and improve search result accuracy. The AI model 102 facilitates two primary search modes—chronological search, and semantic search.

Data Taxonomy 106: The data taxonomy 106 is built by assigning themes to logical chunks of paragraphs contained in each of the documents 114. By associating specific themes with relevant content, the AI model 102 achieves an in-depth understanding of the data, leading to more accurate search results.

Semantic Search: Users can perform semantic searches, which allows the discovery of information with varying degrees of semantic matching: high, medium, or low. The AI model 102 utilizes the data taxonomy 106 (facets) and the custom synonym file 112 to match the user query 122 with relevant ones of the documents 114. This results in contextually appropriate search results 116.

Sort Order & Display: The search results 116 are sorted in reverse chronological order by default, prioritizing the most recent information. Additionally, the search results 116 are displayed as entire relevant paragraphs, eliminating the need for users to click through snippets for a more streamlined and efficient experience. The choice of snippet versus entire paragraph is also customizable depending on end-user experience requirements.

The document analysis system 100 incorporates the AIKE 150, driven by Gen AI/LLM technology. The AIKE 150 functions in synergy with the data taxonomy 106 and semantic search capabilities of the AIPS 110, building on the context already established.

Testing and Selecting the Most Relevant LLM Model: Various state-of-the-art LLM models form the plurality of LLMs 160 (e.g., LLM1, LLM2, . . . LLMn, wherein n is a natural number and n>1) which are evaluated and tested by the model tester 152 to identify the most suitable one for question-answering, summarization, tonality and theme generation tasks in various domains associated with an enterprise such as Enterprise Campaigns, Product Launches, Partnership & Alliances, Press Releases, Investor Relations, Public Relations & Community Engagement. The selected LLM model is then fine-tuned using domain-specific data to optimize performance. Different LLMs of the plurality of LLMs are characterized by the attributes imputed in their development by their providers, e.g., Google®, Open AI®, AWS®, etc.

Named Entity Recognition (NER): NER techniques are applied to identify and extract relevant entities from structured and unstructured data by the entity extractor 154. This aids in providing precise and accurate answers to user questions.

Leveraging Knowledge Graphs: Knowledge graphs are incorporated to facilitate a deeper understanding of relationships between entities and their attributes. These graphs assist in generating contextually appropriate answers to user queries.

Prompt Engineering: The document analysis system 100 utilizes prompt engineering techniques to improve the quality and relevance of generated answers. Specific prompts are designed to elicit comprehensive responses tailored to domain-specific queries.

Caching LLM API Responses: To optimize response time and ensure consistency, LLM API responses are stored in the cache 156 for quick retrieval, especially when dealing with multiple documents across different time horizons.

Figure 2:
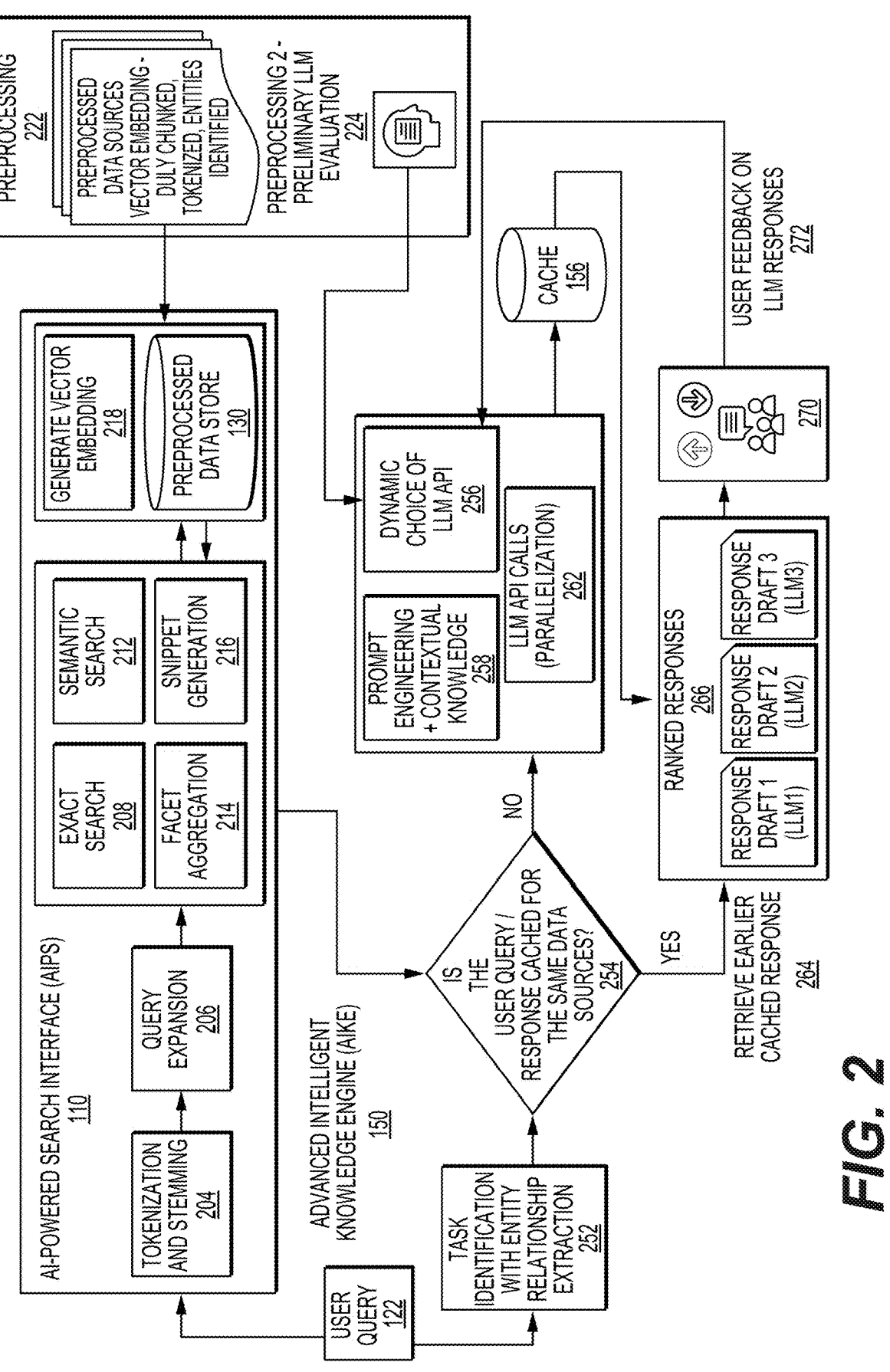
FIG. 2 shows a summary view of the operations of AI-Powered Semantic Search (AIPS) and Advanced Intelligent Knowledge Engine (AIKE) in accordance with certain examples.

FIG. 2 shows a summary view of the operations of the AIPS 110 and the AIKE 150 in accordance with certain examples. When the user query 122 is received, it is tokenized and stemmed 204 and then undergoes query expansion 206 wherein additional terms not originally included in the user query 122 may later be added (e.g., from the custom synonym file 112) to the user query 122 to minimize query-document mismatch and improve information retrieval. This facilitates exact search 208, semantic search 212, facet aggregation 214, and snippet generation 216. Semantic search 212 includes identifying semantically similar pieces of data based, for example, on vector embeddings. Facet aggregation 214 may include multiple aggregations generated on the same set of input documents wherein each aggregation may have its own field in the output of the AIPS 110. These functions are powered by the generating vector embeddings 218 from the preprocessed data store 130.

Upon the entity relationship extraction, the task is identified 252 by AIKE 150. It is checked 254 to verify if the cache 156 contains the user query 122 (or the expanded user query) and/or the response to the user query 122 from the same data sources. If the user query 122 is not in the cache 156, AIKE 150 proceeds with selecting one of the plurality of LLMs 160 e.g., via dynamic choice of LLM APIs 256 for the generation of the response. Prompt engineering techniques are employed with the contextual knowledge 258 for the LLM API calls 262. If at 254, it is determined that the cache 156 contains the user query 122, the earlier responses from different ones of one or more of the plurality of LLMs 160 are retrieved 264 and ranked 266. The highest ranked response(s) may be provided to the users 270. The user feedback is collected 272 and provided to fine-tune the dynamic choice of LLM APIs 256.

The retrieval of search results 116 by the AIPS 110 and the AIKE 150 is enabled via pre-processing 222 which pertains to building the pre-processed data store 130 by accessing a data corpus with documents from different domains which are duly chunked, tokenized, and with entities identified. Pre-processing 224 includes a preliminary evaluation of the plurality of LLMs 160. As mentioned herein, different LLMs may provide different answers of varying accuracies to user queries at any given time. Hence, the AIPS 110 is built on the backend pre-processing which ensures that the most accurate LLMs among the plurality of LLMs 160 are shortlisted for responding to user queries.

Figure 3:
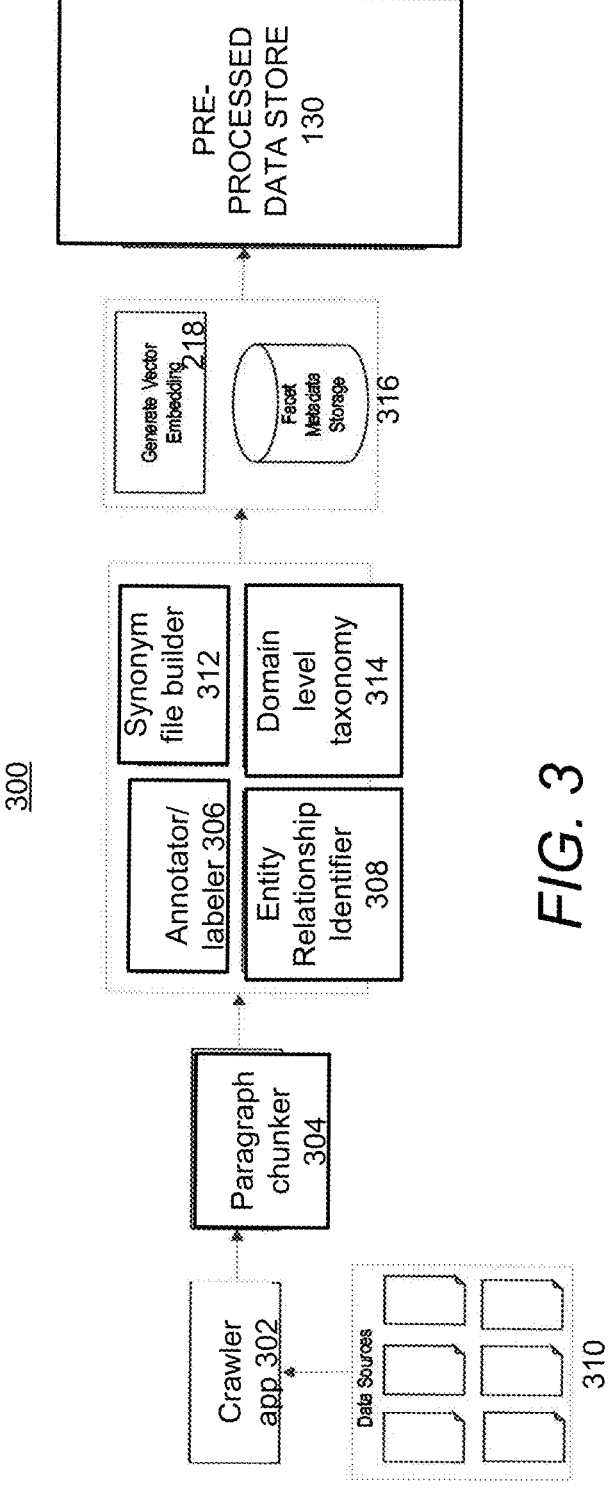
FIG. 3 shows a summary view of the pre-processing 1 to generate a pre-processed data store in accordance with some examples.

FIG. 3 shows a summary view 300 of the pre-processing 222 to generate the pre-processed data store 130 that can be implemented by the AIPS 110 in accordance with some examples. Data crawlers 302 gather the documents 114 from various data sources 310 which can include structured and unstructured data sources. Textual content from the documents 114 is extracted for paragraph chunking 304. The paragraphs are annotated 306 with domain context, and the various entities and their relationships are identified 308, the custom synonym file 112 is built or updated 312 and the facets or domain level taxonomy 314 of the data taxonomy 106 is built or updated 314. The vector embeddings are generated 218, facet metadata is stored 316 to generate the pre-processed data store 130 with vector embeddings-duly chunked, tokenized, and entities identified.

Figure 4:
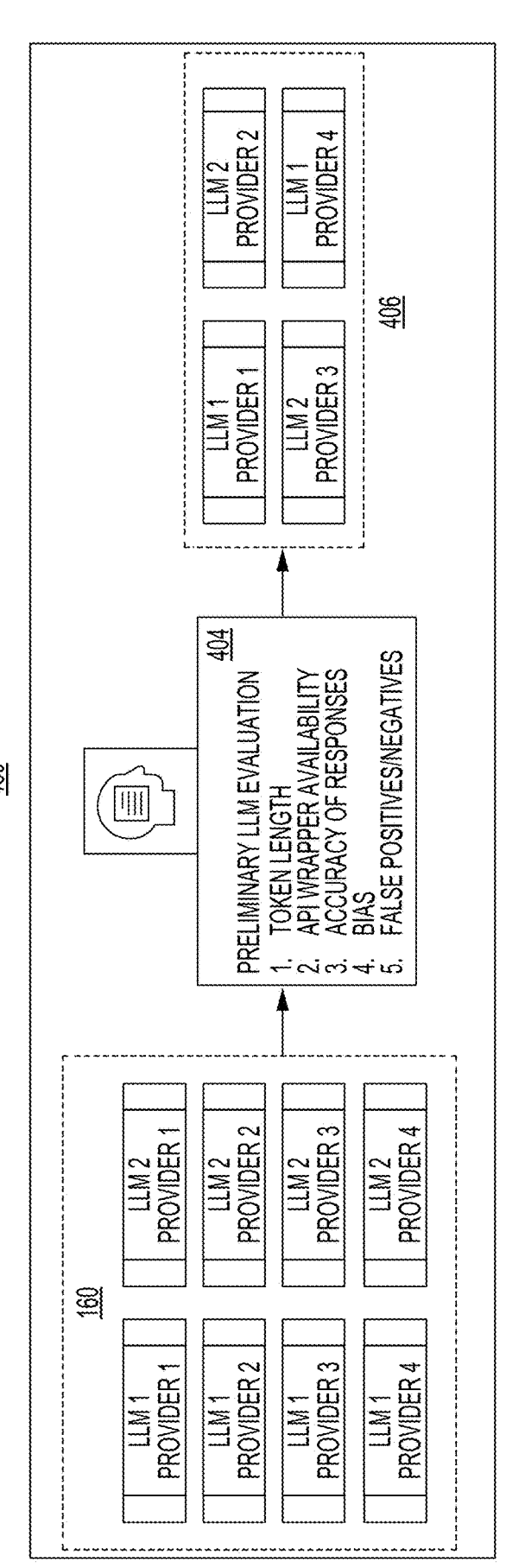
FIG. 4 shows a summary view of the pre-processing 2 for LLM evaluation in accordance with some examples.

FIG. 4 shows a summary view 400 of the pre-processing 224 for LLM evaluation in accordance with some examples. In an example, the model tester 152 may implement the pre-processing 224 for preliminary LLM evaluation. The plurality of LLMs 160 may include different LLMs from different providers. In an example, a single provider may provide different LLMs. In an example, different LLMs from a provider may be trained for different domains. LLMs may be evaluated on criteria 404 including but not limited to token length, API wrapper availability, accuracy of responses, bias, false positives, and false negatives. Different LLMs may produce responses of different accuracies for different domains. Hence, one or more of the plurality of LLMs may be selected based on a domain label associated with the user query 122. Furthermore, the token length (e.g., number of words) that can be handled in the input and the output by the LLM is another consideration that enables the selection of one or more of the plurality of LLMs 160. For example, a subset of the plurality of LLMs 160 may be marked for long context inputs while the choice of LLMs may be wider for shorter context inputs. In an example, the model tester 152 may include a trained AI model such as a classifier with various LLM selection criteria as features for the preliminary evaluation of the plurality of LLMs 160.

When the user query 122 is received and it is determined that a response to the user query 122 is not in the cache 156, then one or more of the plurality of LLMs 160 may be pre-selected 406 by the model tester 152 for response generation for a single user query. In an example, one or more LLMs may be pre-selected based on the analysis (i.e., tokenized, stemmed, and expanded) of the user query 122. The responses from the selected LLMs may be ranked and the top k responses may be presented or displayed to the user. The below steps outline presenting the best LLM model output in response to the user query 122 (in case the response is not already in the cache 156, by dynamically selecting models from an available ensemble model set, given that model performance is specific to the task and may evolve over time.

(i) Leverage Subject Matter Expert (SME) knowledge to evaluate LLM performance and arrive at a preliminary stack ranking of model performance (pre-selection). This feeds as input to the model tester 152.

(ii) Every user query fetches a set of responses-A primary response (of the best-performing LLM) and other sample responses (from other eligible LLMs)

(iii) User submits feedback on model outputs on a Likert scale.

(iv) Collect user feedback on LLM model responses and leverage this as additional input for LLM decisioning or the model tester 152.

(v) Inputs to the model decisioning engine carry differential weights favoring:

(a) SME knowledge input during system build, and (b) User feedback after a predetermined period (when a steady state is achieved).

Figure 5:
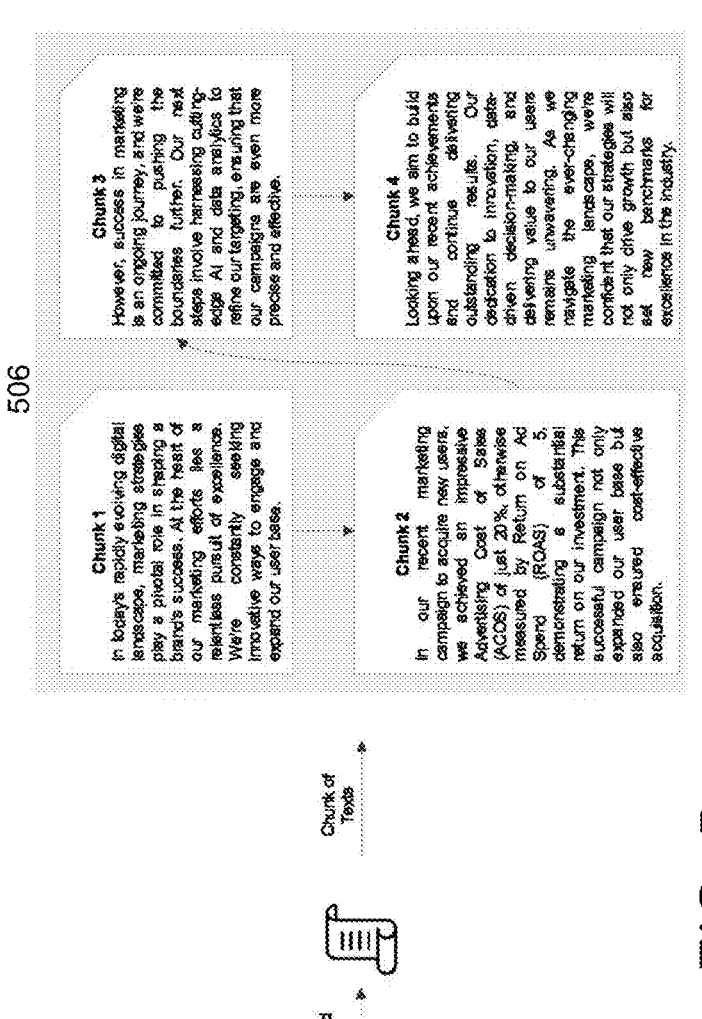
FIG. 5 shows an example of paragraph chunking in accordance with certain examples.

FIG. 5 shows an example of paragraph chunking 304. A block of un-chunked text 502 can be processed to generate a plurality of text chunks or paragraph chunks 506. Paragraph chunking may be implemented using NLP functions. One or more text chunks from the group of text chunks 506 can be provided as a long context input to the selected LLMs 406. However, as mentioned herein, the plurality of LLMs 160 have limited token capacity for inputs and outputs. Furthermore, the LLMs suffer from the 'Lost in the Middle' problem. Hence, the text chunks 506 are created with a maximum pre-determined token limit. Furthermore, each of the text chunks 506 is created to contain full sentences wherein the sentences are selected to fit within the token limit. In an example, the paragraph chunker 304 can be configured so that a predetermined percentage of the token limit is assigned by default for the input context and the remainder of the token limit is automatically reserved for the output of the LLM. Accordingly, different ones of the text chunks 506 have different sizes.

Figure 6:
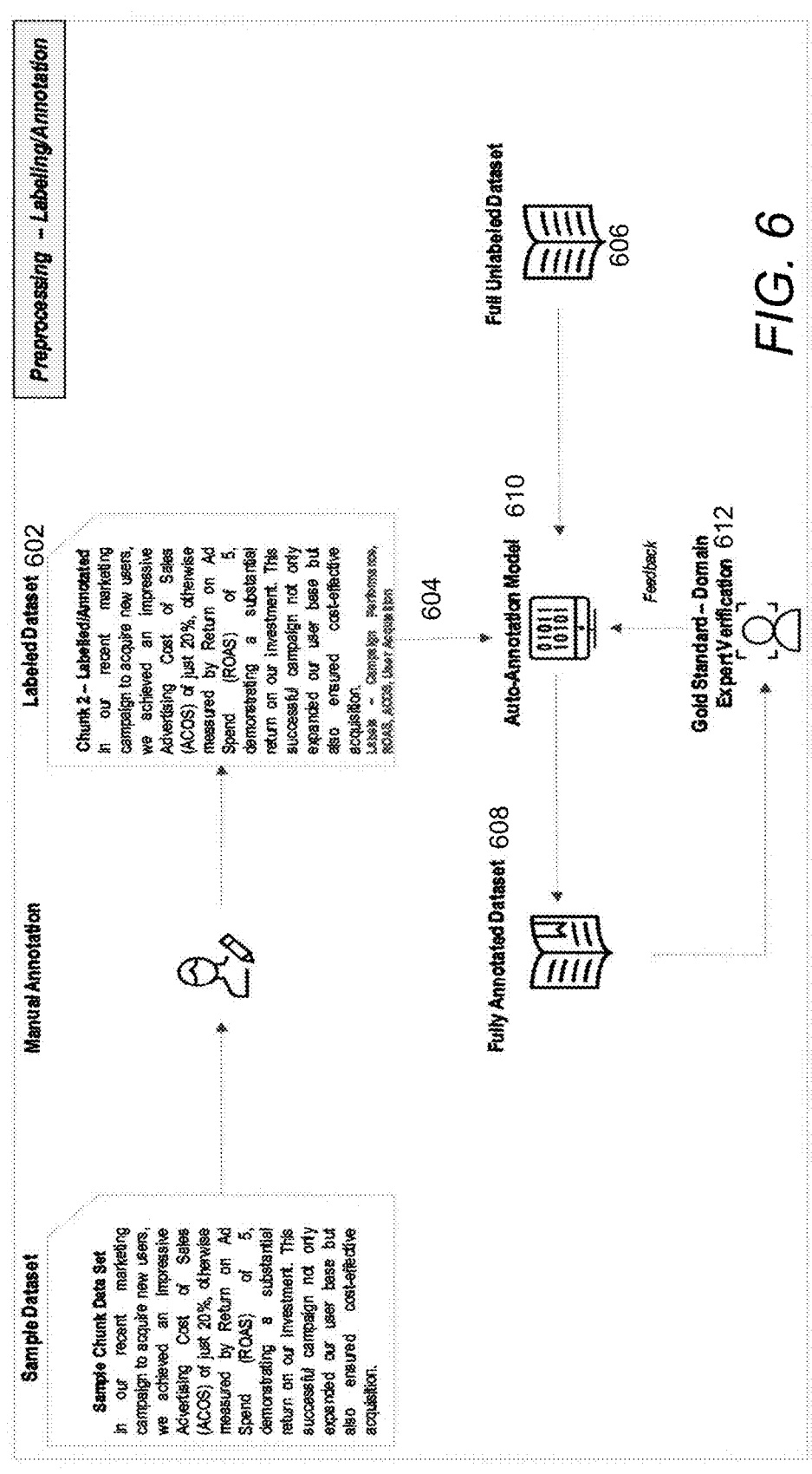
FIG. 6 shows an example of labeling/annotation of paragraphs in accordance with certain examples.

FIG. 6 shows an example of labeling/annotation of paragraphs. A labeled dataset 602 may be generated to train 604 an auto-annotation model 610. Once trained, the auto-annotation model 610 may be able to receive a fully unlabeled dataset 606 to generate a fully labeled dataset 608. In an example, the fully annotated/labeled dataset 608 may be verified 612 by a domain expert. Relevant portions of the fully labeled dataset 608 thus generated can be analyzed for contextual knowledge that can be inputted to one or more of the plurality of LLMs 160 with the prompt for response generation.

Figure 7:
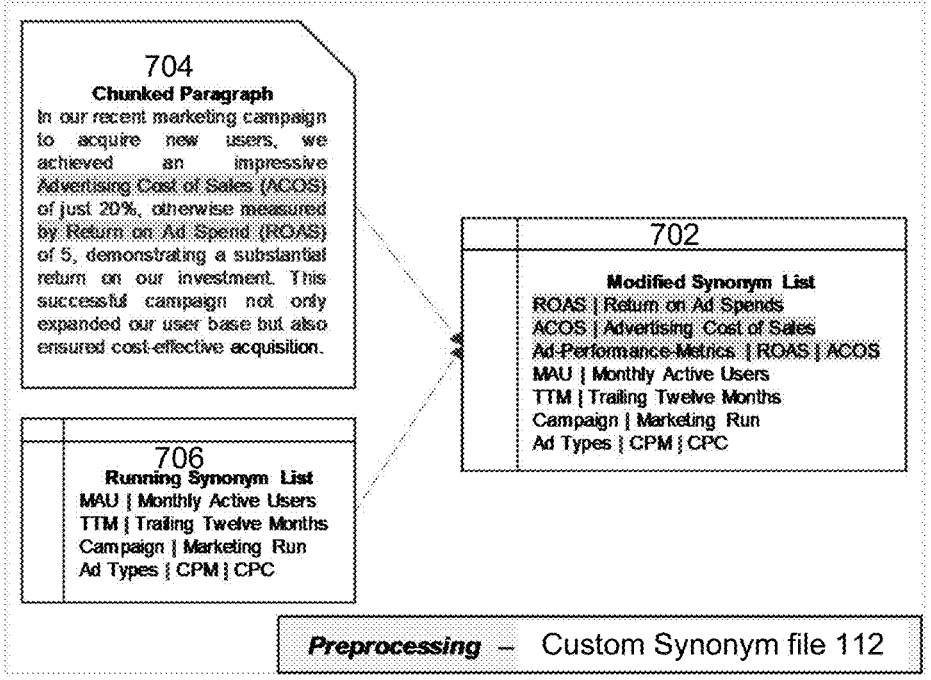
FIG. 7 shows an example of generating or updating a custom synonym file in accordance with certain examples.

FIG. 7 shows an example of generating or updating the custom synonym file 112. In an example, the custom synonym file 112 may also include domain-specific acronyms and may therefore form a domain-specific synonym file. In an example, the custom synonym file 112 can be updated with the modified synonym list 702 by adding new acronyms to a current synonym list 706 via textual processing of a chunked paragraph 704. In an example, a custom synonym file can be generated for each of the different domains identified by the document analysis system 100. The custom synonym files may be analyzed and portions of such files can be passed as input context to the one or more LLMs selected for response generation. If it is determined that the prompt is seeking cross-domain information, then multiple custom synonym files of the different domains involved in the user query 122 may be analyzed and portions thereof can be passed to the one or more LLMs selected for response generation.

Figure 8:
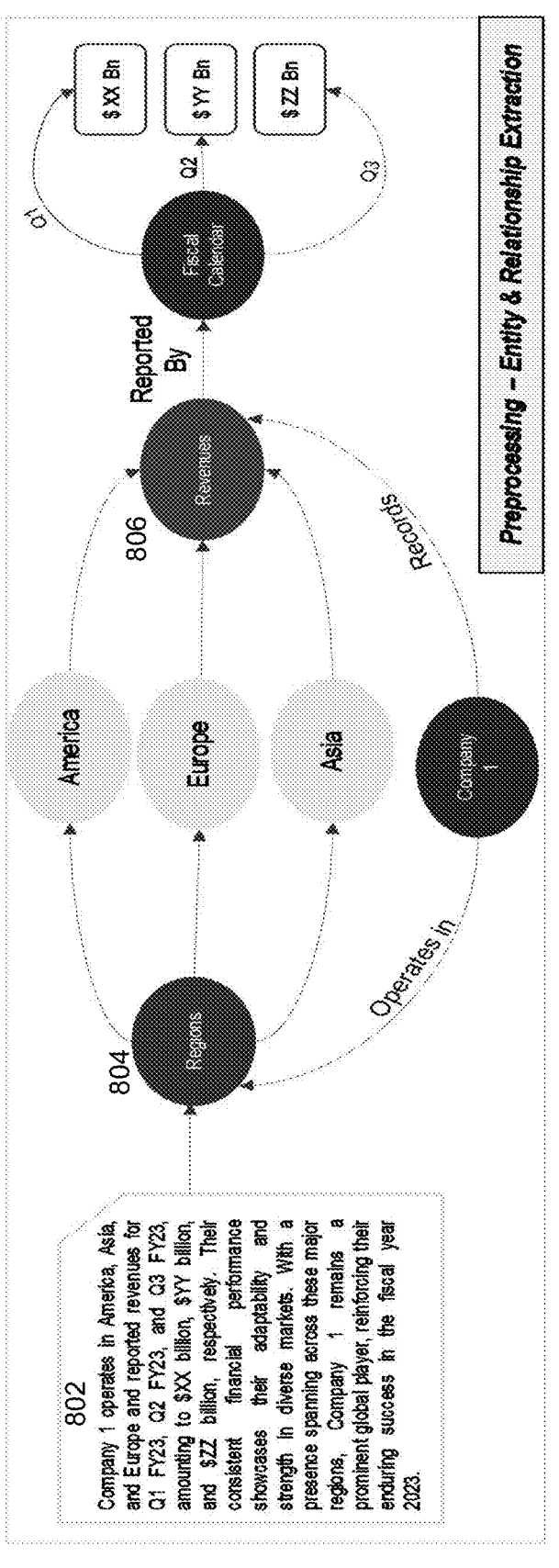
FIG. 8 shows an example knowledge graph (KG) that can be built by the system in accordance with some examples.

FIG. 8 shows an example knowledge graph (KG) 800 that can be built by the document analysis system 100 in accordance with some examples. The knowledge graph 800 can be built via entity extraction from a textual input 802 (e.g., a paragraph chunk) using techniques such as named entity recognition (NER). The Knowledge Graph 800 encodes relationships between region entities 804 revenue entities 806 ordered per the fiscal calendar which are represented as nodes and sub-nodes. Different knowledge graphs may thus be created from pre-processing 222 which may be domain-specific or which may encode cross-domain information thereby enabling the document analysis system 100 to provide responses that require information to be collated across the domains.

Figure 9:
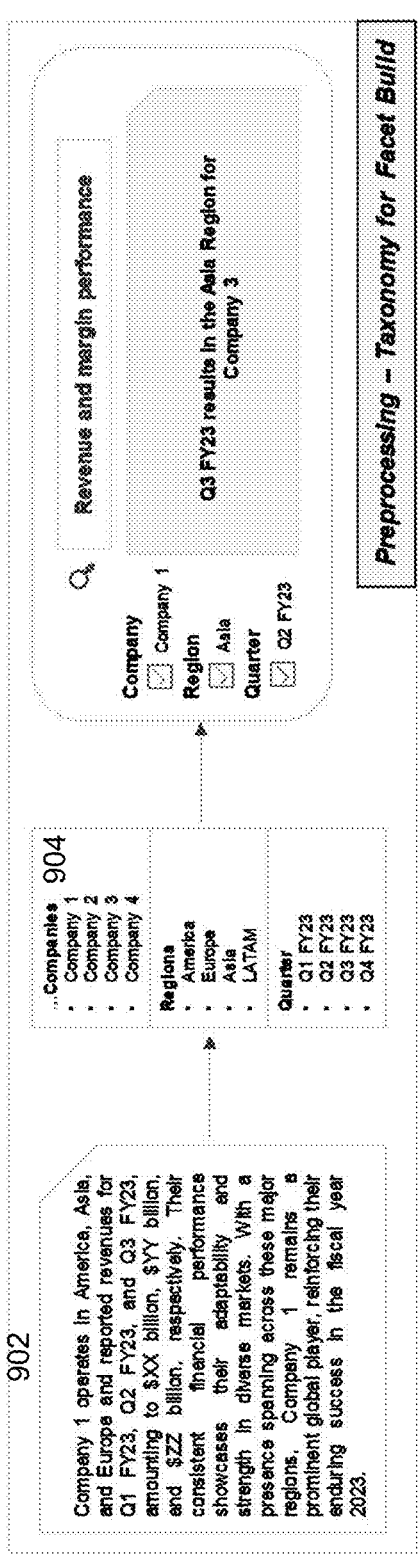
FIG. 9 shows the use of a data taxonomy for facet building or the creation of facets/entities from a parsed input paragraph.

FIG. 9 shows using the data taxonomy 106 for facet building or creation of facets/entities from a parsed input paragraph. The chunked text input 902 is analyzed to build a portion 904 of the data taxonomy 106. The relevant filter options and entities are automatically identified from chunked text input 902 that is continuously parsed by:

(i) Seeding set taxonomy and the knowledge graph (KG) created for this functional/domain area with categories of
  (a) Facets and contained filters [Ex: Facet—Geography, Filter—Europe, America]
  (b) Nodes, sub-nodes and relationships;
(ii) Using Named Entity Recognition (NER) and key phrase extraction techniques to identify and extract entities from parsed input text/
(iii) Incrementally mapping identified entities to existing domain-specific data taxonomy.
(iv) Expanding the taxonomy and refining KG based on new entities and contained relationships, through unsupervised learning;
(v) Annotating and storing for later processing-identified facets, nodes, and sub-nodes from the KG and taxonomy
(vi) Iterating through the process described in steps (i) to (v) above for every input paragraph that is parsed.

Given a user query on the screen, the document analysis system 100 may auto-apply relevant filter options and extract relevant entities while providing a response by:

(i) Using NER and key phrase extraction techniques to identify and extract entities from parsed input text;
(ii) Cross-referencing extracted entities contained in the user query with the universe of facets and associated filters built from parsing input paragraphs (of data sources); and
(iii) Leveraging semantic search to identify and display relevant paragraphs that contain the information requested in the user query.

Figure 10:
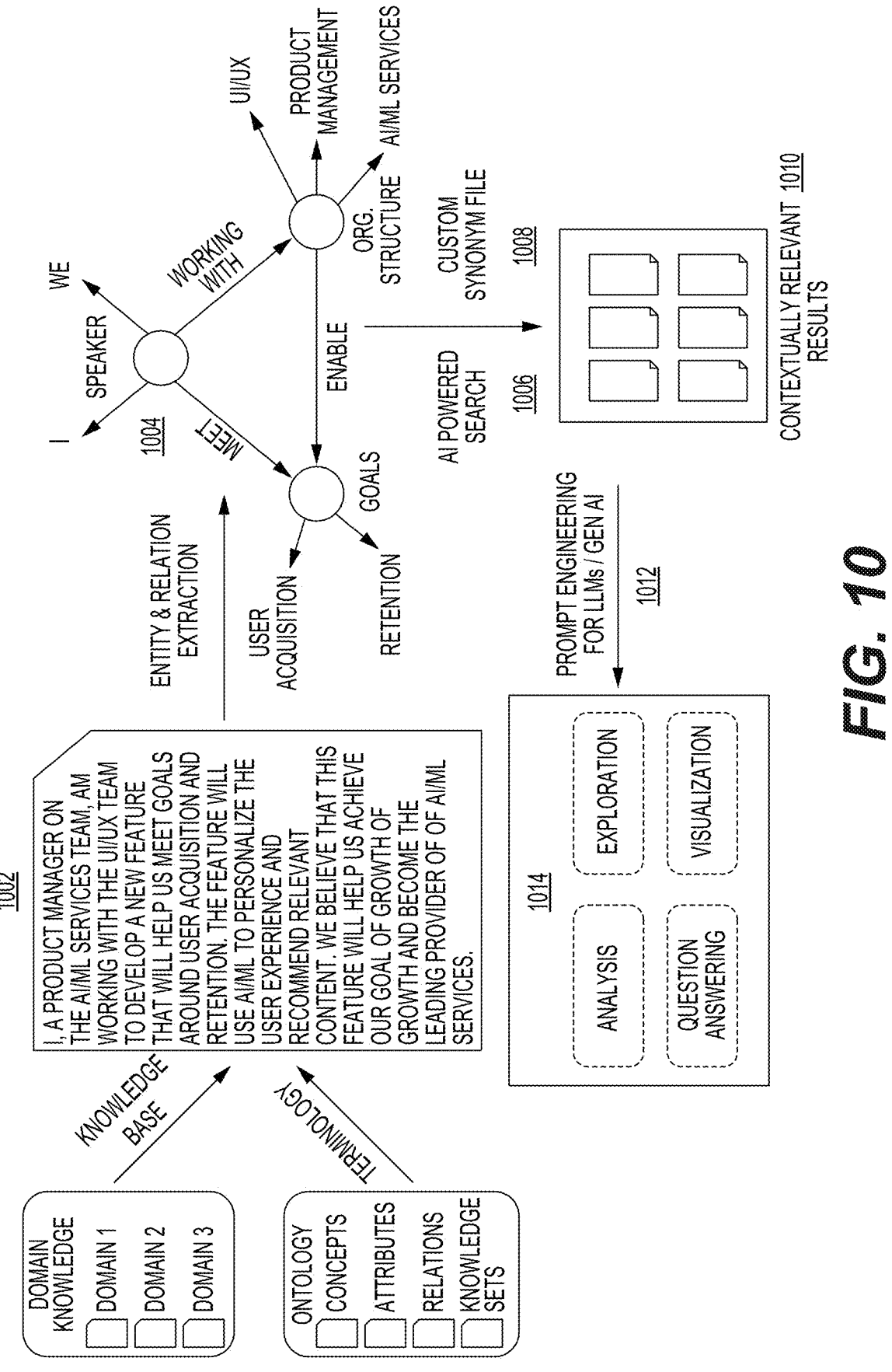
FIG. 10 shows an example use case for the document analysis system.

FIG. 10 shows an example use case 1000 for the document analysis system 100. A user requirement 1002 specifying the user's role and informational need is input to the document analysis system 100. Entities and their relationships are extracted to build the KG 1004. Contextually relevant search results 1010 can be retrieved from the cache 156 if a similar query was previously run. If not, AI-powered search 1006 with the custom synonym file 1008 is executed by the AIPS 110 to retrieve contextually relevant results 1010 from the pre-processed data store 130. Furthermore, a preliminary LLM selection with prompt engineering 1012 can be implemented by the AIKE 150 for different requests 1014 conveyed by the user in the user requirement 1002. These requests may include one or more of analyses, exploration, question answering, and visualization.

As seen from the example use case 1000, the user requirement 1002 may require information from both structured and unstructured data sources e.g., relational tables and knowledge bases. Given a user query on the screen, the document analysis system 100 distinguishes between structured (organized, found in tables) from unstructured (text content) aspects of the user query 122/1002 or question by:

(i) Extracting labels of measures stored in tables (structured data) into a Javascript Object Notation (JSON) or equivalent format;
(ii) From the input user query e.g., the user requirement 1002—Using NER and key phrase extraction techniques to identify and extract entities;
(iii) Cross-referencing entities from the user query to those labels that correspond to structured measures and the corresponding tables, extracting required information;
(iv) For unstructured data entities contained in the user query, leveraging semantic search and knowledge graph to return relevant results; and
(v) Additionally, passing selected tables with necessary measures (as identified in step 3) to an LLM of choice, along with the user query and a tailored prompt to synthesize a text response that will be displayed to the user.

Additional aspects of the document analysis system 100 including AIPS 110 and the AIKE 150 may include summarization, Q & A patterns, and annotation abilities as detailed below:

Q & A Functionality: The document analysis system 100 may incorporate an advanced question-answering feature that ensures minimal to zero room for error in responses. This feature allows users to ask specific questions to mine insights across documents—Extract narratives, industry trends, financials, performance metrics, and strategic areas of focus.

Operation: The advanced question-answering feature utilizes the data taxonomy 106 and context derived from pre-processing 222 and the Gen AI/LLM-powered data analysis from pre-processing 224. When the user poses a question, the document analysis system 100 employs Natural Language Processing (NLP) techniques to understand the query accurately.

Named Entity Recognition (NER): The document analysis system 100 can identify key entities, such as company names, competitors, and industry-specific terms, within the user's question to enhance precision.

Prompt Engineering: The document analysis system 100 can formulate the user's question into an optimized prompt to selected ones of the plurality of LLMs 160 thereby ensuring that the most relevant and contextually accurate response is provided to the user.

Language Model Capabilities: Leveraging the power of Gen AI/LLM, the document analysis system 100 understands complex questions and provides nuanced answers based on the analysis of a vast repository of documents.

Benefits: Time savings (Minimize time spent on extensive research), decision-making support (well-informed decisions based on verified and up-to-date information), error-free insights (deliver minimal or zero error responses, enabling them to confidently act on the obtained information), and accessibility (for users with varying levels of expertise).

Summarization Functionality: The document analysis system 100 can generate concise and informative summaries of lengthy documents, such as product launches, Environmental, Social, and Governance (ESG) publications, conference documents, earnings call transcripts, research analyst reports, or annual publications.

Operation: The Gen AI/LLM-based preprocessing 224 can analyze the document's content and identify the most critical information, key insights, and significant events. It then generates a coherent and structured summary that captures the essence of the document, providing the user with a quick overview of the important points.

Benefits: Summarization enables users to save time and effort by quickly grasping the main ideas without reading through entire documents, making it easier to stay up-to-date with the latest developments in the industry.

Theme Generation Functionality: The document analysis system 100 identifies and categorizes themes and topics discussed in various documents, including ESG publications, strategic announcements, product launches, press releases, regulatory filings, call transcripts, and reports.

Operation: Leveraging the data taxonomy from Part 1, the Gen AI/LLM identifies recurring themes, keywords, and subjects within the documents. It then groups related content into themes, allowing users to explore information based on specific topics of interest.

Benefits: Theme generation enables users to gain a comprehensive understanding of the subjects being discussed in different documents, helping them identify emerging trends, areas of focus, and potential risks or opportunities.

Tonality Analysis Functionality: The document analysis system 100 evaluates the tonality of documents, such as press releases, analyst reports, and other public statements.

Operation: The Gen AI/LLM performs sentiment analysis on the text to determine whether the tone is positive, negative, or neutral. It assesses the sentiment expressed towards the company, its products, financial performance, and market outlook.

Benefits: Tonality analysis helps users gauge the overall sentiment surrounding the company or its competitors, providing valuable insights into public perception and potential impacts on investor sentiment.

Competitor and Partner Analysis Functionality: The document analysis system 100 allows users to compare and analyze data from the company, its closest competitors by revenue and market capitalization, and ecosystem partners across industries.

Operation: By combining information from various documents, such as financial reports, earnings call transcripts, and industry-specific publications, the Gen AI/LLM identifies key metrics, trends, and performance indicators for each entity.

Benefits: Users can gain a comprehensive view of the company's competitive landscape, assess relative strengths and weaknesses, and make data-driven decisions regarding investment, partnership opportunities, and strategic positioning.

Metric Analysis Functionality: The system analyzes various metrics, including financials, macroeconomic factors, listed client metrics, success stories, people and headcount metrics, investment areas, future outlook, segment analysis by geographical operations, strategic areas of focus, acquisitions, divestitures, and other key performance indicators.

Operation: The Gen AI/LLM-based pre-process 224 and interprets data from multiple sources to provide a holistic view of the company's and its competitors' performance and strategic directions.

Benefits: Comprehensive metrics analysis equips users with the necessary data to evaluate the company's performance, assess market trends, and make informed decisions based on a comprehensive set of data points.

Indicative outcomes that can be delivered by the document analysis system 100 over a time horizon include:

Collaborations and Alliances: The document analysis system 100 can identify partnerships, collaborations, and alliances of competitors mentioned in various documents. Furthermore, the document analysis system 100 helps depict the interconnectedness between competitors and their ecosystem partners, highlighting potential opportunities and threats Key Wins and Milestones: The document analysis system 100 can identify significant events like acquisitions, product launches, or market expansions mentioned in various documents. The knowledge graph can then connect these events to their financial impacts, helping senior executives assess the competition's strategic successes and potential vulnerabilities.

Evaluating Market Positioning: By analyzing competitor communication on ecosystem partnerships, the system can determine how such collaborations position them within the industry. The system can identify the types of partnerships that lead to competitive advantages or new market access.

Financial Performance: The system can extract and summarize financial data, such as revenue, profits, and growth rates, from SEC filings (10Q, 10K) and earnings call transcripts of competitors. The system helps visualize/analyze financial and non-financial metrics over time, providing a clear view of their financial performance trends and identifying key areas of growth or concern.

Impact of Macro Changes: By analyzing press releases and annual publications of competitors, the system can identify how macroeconomic changes have influenced their operations. The system helps users establish links between macroeconomic events and corresponding actions taken by competitors, offering a comprehensive understanding of their adaptability and strategies.

Future Outlook and Investment Areas: By summarizing research analyst reports and annual analyst events, the system can provide insights into the projected growth areas and potential investment targets of competitors. The system helps organize these projections to facilitate better strategic planning.

Impact on Hiring and Headcount: By extracting relevant data from press releases and regulatory documents such as Securities and Exchange Commission (SEC) filings, the document analysis system 100 can assess how partnerships have influenced hiring patterns and organizational expansions for competitors. The system can present a timeline of changes in workforce size alongside key partnership announcements.

Industry and Geographic Segment Analysis: The system can help users analyze how competitors are performing in specific industries and geographic regions, and the distribution of their business operations across key segments, industries, and their relative strengths.

It is the interplay of AI, Gen-AI (LLMs), and Human In The Loop (HITL) that drives the document analysis system 100 for intelligent cross-domain document analysis which enables:

(i) Dynamic paragraph chunking—Breaks down large volumes into logically grouped sections, (ii) Human initiated, auto-annotation/labeling with expert feedback—Introduces domain context while not limiting searches to verbatim text, (iii) Functional area-curated synonym file—Permits expansion to acronyms and other domain-specific phrases often interchangeably used, (iv) Automatic entity and relationship identification & mapping—Resolves entities and systematically builds a knowledge graph, (v) Vector embedding & semantic search—Improves search performance by understanding user intent along with contextual relevance of annotation, (vi) Preliminary expert-driven LLM evaluation—Leverage domain and technology expertise for LLM selection (best-case), (vii) Dynamic LLM calls, user feedback on LLMs, and response re-ranking—Accentuate end-user feedback for reranking responses and drive improvements in prompt engineering, and (viii) Caching—Delivering speed of responses, minimizes cost (via repeated LLM calls).

Figure 11:
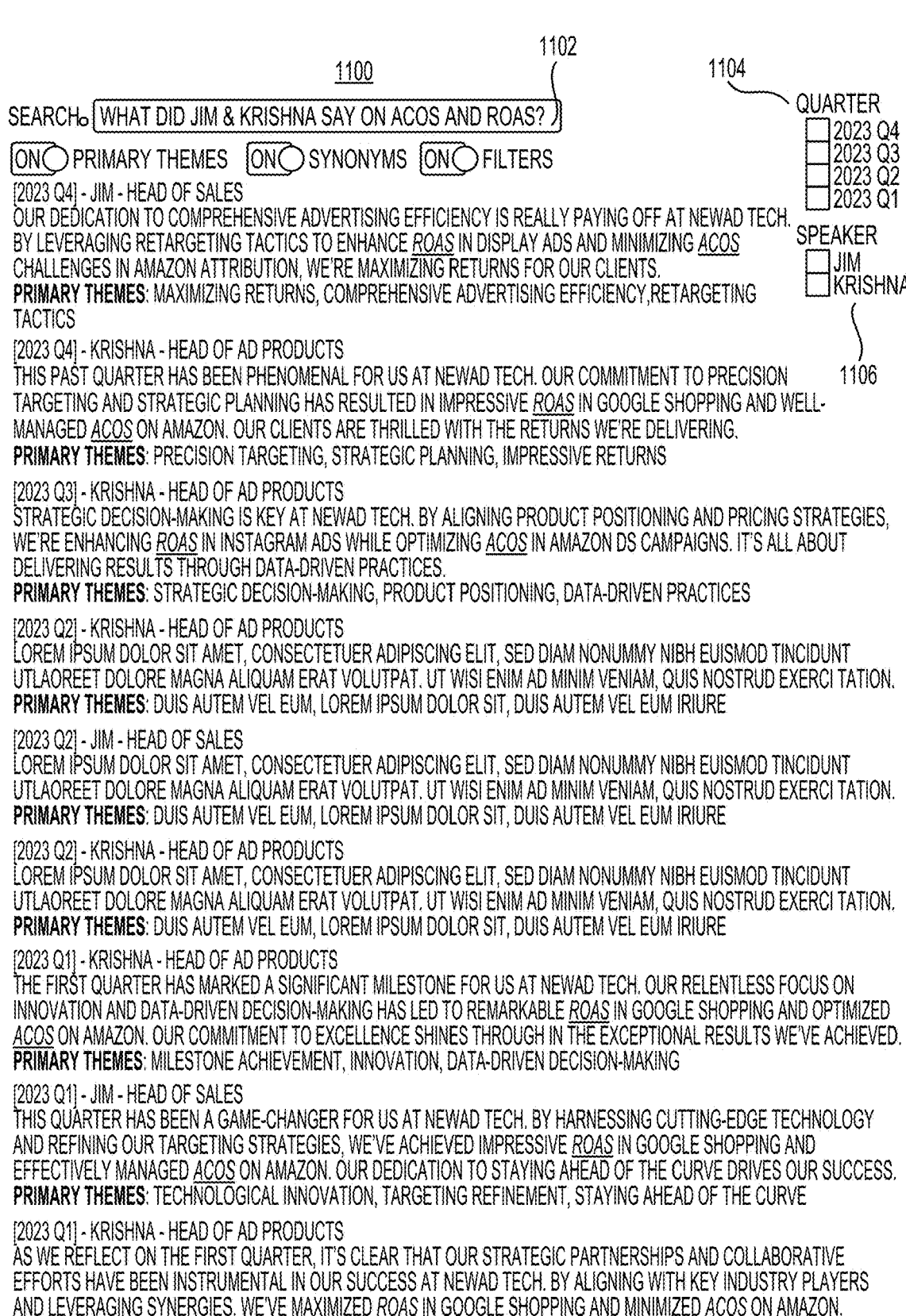
FIG. 11 shows examples of search results generated from the pre-processed data store in accordance with some examples.

FIG. 11 shows a search results interface 1100 displaying examples of search results generated from the pre-processed data store in accordance with some examples. The user requirement or user query 1102 is framed in a natural language, "What did Jim and Krishna say on ACOS and ROAS?" The document analysis system 100 can process the user query 1102 via tokenization, stemming, query expansion, etc. In an example, the cache 156 may be searched (using one or more of exact search 208 and semantic search 212) to determine if a response to the user query 1102 is stored therein. If the response to the user query 1102 could not be identified from the cache 156, the document analysis system 100 proceeds with one or more of exact search 208 and semantic search 212 of the preprocessed data store 130 using vector embeddings. Various temporal filters 1104 and entity filters 1106 (e.g. speakers) for different quarters are enabled by facet aggregation 214, snippet generation 216, entity relationship identifier 308, annotator/labeler 306, etc. For example, the temporal filters 1104 and entity filters 1106 may be represented as nodes and sub-nodes in the knowledge graphs storing the entities and relationships between the entities as derived from the data store 130.

Figure 12:
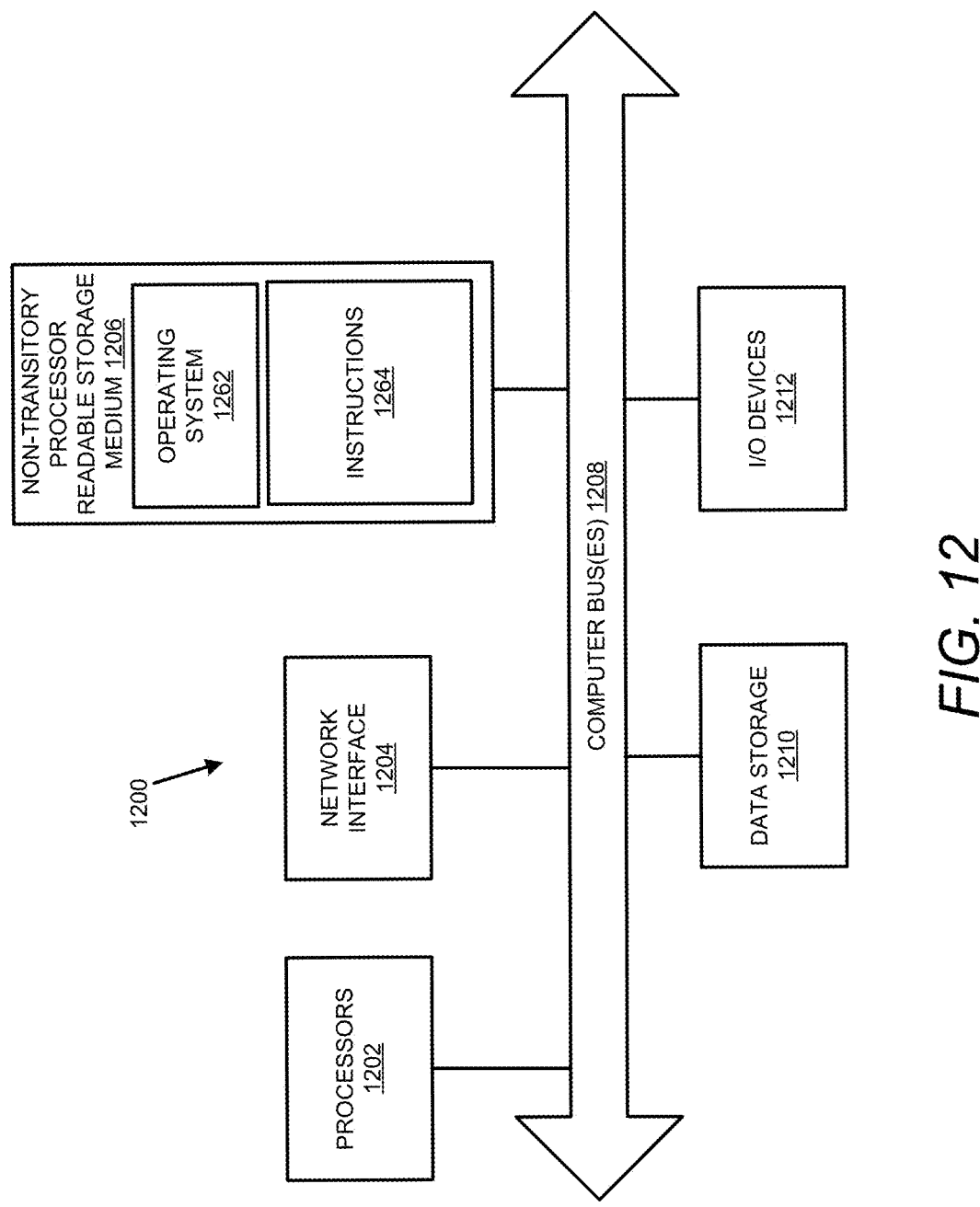
FIG. 12 illustrates a computer system that may be used to implement the document analysis system in accordance with the examples disclosed herein.

FIG. 12 illustrates a computer system 1200 that may be used to implement the document analysis system 100 in accordance with the examples disclosed herein. More particularly, computing machines such as desktops, laptops, smartphones, tablets, and wearables which may be used to generate or access the data from the document analysis system 100 may have the structure of the computer system 1200. The computer system 1200 may include additional components not shown and some of the process components described may be removed and/or modified. In another example, a computer system 1200 can sit on external cloud platforms such as Amazon Web Services, AZURE® cloud or internal corporate cloud computing clusters, or organizational computing resources, etc.

The computer system 1200 includes processor(s) 1202, such as a central processing unit, ASIC or another type of hardware processing circuit, input/output (I/O) devices 1212, such as a display, mouse keyboard, etc., a network interface 1204, such as a Local Area Network (LAN), a wireless 802.11x LAN, a 3G, 4G or 5G mobile WAN or a WiMax WAN, and a processor-readable medium 1206. Each of these components may be operatively coupled to a bus 1208. The processor-readable or computer-readable medium 1206 may be any suitable medium that participates in providing instructions to the processor(s) 1202 for execution. For example, the processor-readable medium 1206 may be a non-transitory or non-volatile medium, such as a magnetic disk or solid-state non-volatile memory, or a volatile medium such as RAM. The instructions or modules stored on the processor-readable medium 1206 may include machine-readable instructions 1264 executed by the processor(s) 1202 that cause the processor(s) 1202 to perform the methods and functions of the document analysis system 100.

The document analysis system 100 may be implemented as software or machine-readable instructions stored on a non-transitory processor-readable storage medium and executed by one or more processors 1202. For example, the computer-readable storage medium or non-transitory processor-readable medium 1206 may store an operating system 1262, such as MAC OS, MS WINDOWS, UNIX, or LINUX, and code/instructions 1264 for the document analysis system 100. The operating system 1262 may be multi-user, multiprocessing, multitasking, multithreading, real-time, and the like. For example, during runtime, the operating system 1262 is running and the code for the document analysis system 100 is executed by the processor(s) 1202.

The computer system 1200 may include a data storage 1210, which may include non-volatile data storage. The data storage 1210 stores any data used by the document analysis system 100. The data storage 1210 may be used as local data storage of the document analysis system 100 to store the user queries, results, knowledge graphs, and other data generated or used by the document analysis system 100.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

15

What is claimed is:

1. An Artificial Intelligence (AI) based document analysis system, comprising:
   at least one hardware processor; and
   at least one non-transitory processor-readable medium storing instructions executed by the at least one hardware processor to:
   generate via pre-processing structured and unstructured data sources, a data taxonomy extracted from the structured and unstructured data sources and a custom synonym file that lists domain-specific synonyms extracted from the structured and unstructured data sources;
   select, from a plurality of Large Language Models (LLMs) one or more LLMs for generating responses to user queries, wherein the one or more LLMs are selected by an Artificial Intelligence (AI)-based model tester;
   determine that a response to a received user requirement is to be generated;
   retrieve using the data taxonomy, relevant documents for the received user requirement from one or more of the structured and unstructured data sources, wherein relevant documents are retrieved by;
      accessing text data from the structured and unstructured data sources;
      generating paragraph chunks from the text data;
      for each paragraph chunk:
         identify and extract entities and relationships between the entities by using Named Entity Recognition (NER) and one or more key phrase extraction techniques;
         map the identified entities to the data taxonomy;
         seed the data taxonomy with facets and filters corresponding to the identified entities, the facets and filters being represented as nodes and sub-nodes; and
         build one or more knowledge graphs representing the identified entities and the relationships between the identified entities;
   generate a prompt to the one or more LLMs from the relevant documents based at least on the received user requirement, wherein the prompt is generated to include less than a predetermined number of tokens arranged in complete sentences;
   obtain a response to the prompt from each of the one or more LLMs;
   receive user feedback to each of the responses from the one or more LLMs provided as replies to the received user requirement; and
   further train the AI-based model tester on the user feedback for LLM selection.

2. The AI-based document analysis system of claim 1, wherein the non-transitory processor-readable medium storing instructions executed by the at least one hardware processor to further:
   store in a cache, one of the plurality of responses receiving highest user approval as a reply to the received user requirement along with the received user requirement and a subset of the structured and unstructured data sources used for generating the prompt.

3. The AI-based document analysis system of claim 1, wherein the non-transitory processor-readable medium storing instructions executed by the at least one hardware processor to further:
   train the AI-based model tester for LLM selection on features that include at least, token length, Application Programming Interface (API) wrapper availability, accuracy of responses, bias, false positives, and false negatives.

4. The AI-based document analysis system of claim 1, wherein to generate the prompt, the non-transitory processor-readable medium storing instructions executed by the at least one hardware processor to further:
   verify that the response to the received user requirement is not already stored in a cache.

5. The AI-based document analysis system of claim 1, wherein to generate the prompt, the non-transitory processor-readable medium storing instructions executed by the at least one hardware processor to further:
   identify and extract one or more entities from the received user requirement; and
   extract required information for response generation from the unstructured and structured data sources with the entities extracted from the received user requirement.

6. The AI-based document analysis system of claim 5, wherein to obtain the response to the prompt from each of the one or more LLMs the non-transitory processor-readable medium storing instructions executed by the at least one hardware processor to further:
   input along with the prompt, the required information extracted from the unstructured and structured data sources to the one or more LLMs.

7. The AI-based document analysis system of claim 1, wherein to obtain the response to the prompt from each of the one or more LLMs the non-transitory processor-readable medium storing instructions executed by the at least one hardware processor to further:
   obtain the response to the prompt with a token length such that a total number of tokens of the prompt and the response are less than the predetermined number of tokens.

8. The AI-based document analysis system of claim 1, wherein to receive the user feedback to the responses from each of the one or more LLMs the non-transitory processor-readable medium storing instructions executed by the at least one hardware processor to further:
   rank the responses from each of the one or more LLMs based at least on similarity with the received user requirement; and
   display top k ranked responses for user selection, wherein k is a natural number and k begins with 1 and the top k ranked responses include a primary response from a best performing LLM of the one or more LLMs and other sample responses from other eligible LLMs of the one or more LLMs.

9. The AI-based document analysis system of claim 1, wherein to further train the AI-based model tester the non-transitory processor-readable medium storing instructions executed by the at least one hardware processor to further:
   provide inputs to the AI-based model tester, wherein the inputs carry differential weights favoring Subject Matter Expert (SME) knowledge and the user feedback.

10. The AI-based document analysis system of claim 1, wherein the non-transitory processor-readable medium storing instructions executed by the at least one hardware processor to further:
   expand the data taxonomy and refine the knowledge graph based on identified entities and relationships between the identified entities, through unsupervised learning of the LLM.

11. The AI-based document analysis system of claim 10, wherein the non-transitory processor-readable medium storing instructions executed by the at least one hardware processor to further:

annotate and store identified facets, nodes, and sub-nodes from the refined knowledge graph and the expanded data taxonomy.

12. An Artificial Intelligence (AI) based document analysis method, comprising:

generating via pre-processing structured and unstructured data sources, a data taxonomy extracted from the structured and unstructured data sources and a custom synonym file that lists domain-specific synonyms extracted from the structured and unstructured data sources;

selecting, from a plurality of Large Language Models (LLMs) one or more LLMs that can provide response to user queries, wherein the one or more LLMs are selected by an Artificial Intelligence (AI)-based model tester;

determining that a response to a received user requirement is to be generated;

retrieving using the data taxonomy, relevant paragraphs for the received user requirement from one or more of the structured and unstructured data sources, wherein relevant documents are retrieved by;

accessing text data from the structured and unstructured data sources;

generating paragraph chunks from the text data;

for each paragraph chunk:

identify and extract entities and relationships between the entities by using Named Entity Recognition (NER) and one or more key phrase extraction techniques;

map the identified entities to the data taxonomy;

seed the data taxonomy with facets and filters corresponding to the identified entities, the facets and filters being represented as nodes and sub-nodes; and build one or more knowledge graphs representing the identified entities and the relationships between the identified entities;

generating a prompt to the one or more LLMs from the relevant documents based at least on the received user requirement, wherein the prompt is generated to include less than a predetermined number of tokens arranged in complete sentences;

obtaining a response to the prompt from each of the one or more LLMs;

receiving user feedback to a plurality of the responses from the one or more LLMs provided as replies to the received user requirement; and further training the AI-based model tester on the user feedback for LLM selection.

13. The AI-based document analysis method of claim 12, further comprising:

storing in a cache, one of the plurality of responses receiving highest user approval as a reply to the received user requirement along with the received user requirement and a subset of the structured and unstructured data sources used for generating the prompt.

14. The AI-based document analysis method of claim 12, further comprising:

training the AI based model tester for LLM selection on features that include at least, token length, Application Programming Interface (API) wrapper availability, accuracy of responses, bias, false positives and false negatives.

15. The AI-based document analysis method of claim 12, wherein generating the prompt further comprises:

extracting one or more entities from the received user requirement; and extracting required information for response generation from the unstructured and structured data sources with the entities extracted from the received user requirement.

16. The AI-based document analysis method of claim 15, wherein generating the prompt further comprises:

inputting along with the prompt, the required information extracted from the unstructured and structured data sources to the one or more LLMs.

17. The AI-based document analysis method of claim 12, wherein further training the AI-based model tester comprises:

providing inputs to the AI-based model tester, wherein the inputs carry differential weights favoring Subject Matter Expert (SME) knowledge and the user feedback.

18. A non-transitory processor-readable storage medium comprising machine-readable instructions that cause a processor to:

generate via pre-processing structured and unstructured data sources, a data taxonomy extracted from the structured and unstructured data sources and a custom synonym file that lists domain-specific synonyms extracted from the structured and unstructured data sources;

select, from a plurality of Large Language Models (LLMs) one or more LLMs that can provide response to user queries, wherein the one or more LLMs are selected by an Artificial Intelligence (AI)-based model tester;

determine that a response to a received user requirement is to be generated;

retrieve using the data taxonomy, relevant paragraphs for the received user requirement from one or more of the structured and unstructured data sources, wherein relevant documents are retrieved by:

accessing text data from the structured and unstructured data sources;

generating paragraph chunks from the text data;

for each paragraph chunk:

identify and extract entities and relationships between the entities by using Named Entity Recognition (NER) and one or more key phrase extraction techniques;

map the identified entities to the data taxonomy;

seed the data taxonomy with facets and filters corresponding to the identified entities, the facets and filters being represented as nodes and sub-nodes; and build one or more knowledge graphs representing the identified entities and the relationships between the identified entities;

generate a prompt to the one or more LLMs from the relevant documents based at least one the received user requirement, wherein the at least one prompt includes at least a chunk having less than a predetermined number of tokens arranged in complete sentences;

obtain a response to the prompt from each of the one or more LLMs;

receive user feedback to the responses obtained from the one or more LLMs provided; and further train the AI-based model tester on the user feedback for LLM selection.

19. The non-transitory processor-readable storage medium of claim 18, wherein the machine-readable instructions cause the processor to:

rank the responses obtained from the one or more LLMs based at least on a semantic similarity with the received user requirement; and provide top k ranked responses as replies to the received user requirement, wherein k is a natural number.

* * * * *